(12) United States Patent
Kim (10) Patent No.: US 7,971,456 B2
(45) Date of Patent: Jul. 5, 2011

(54) TUB ASSEMBLY AND WASHING MACHINE INCLUDING THE SAME

(75) Inventor: Young Soo Kim, Changwon-si (KR)

(73) Assignee: LG Electronics, Inc., Seoul (KR)

( * ) Notice: Subject to any disclaimer, the term of this patent is extended or adjusted under 35 U.S.C. 154(b) by 852 days.

(21) Appl. No.: 11/505,491

(22) Filed: Aug. 17, 2006

(65) Prior Publication Data

US 2007/0113597 A1 May 24, 2007

(30) Foreign Application Priority Data

Aug. 18, 2005 (KR) .................. 10-2005-0075865
Aug. 18, 2005 (KR) .................. 10-2005-0075866

(51) Int. Cl.
*D06F 21/00* (2006.01)
(52) U.S. Cl. ...................................... 68/140
(58) Field of Classification Search .................. 68/139, 68/140, 142
See application file for complete search history.

(56) References Cited

U.S. PATENT DOCUMENTS

| 2,330,421 | A | * | 9/1943 | Haberstump | 68/144 |
| 2,343,742 | A | * | 3/1944 | Breckenridge | 68/23.1 |
| 2005/0005652 | A1 | * | 1/2005 | Park et al. | 68/24 |

FOREIGN PATENT DOCUMENTS

| DE | 86 11 714 | 7/1986 |
| DE | 693 07 668 | 5/1997 |
| EP | 0 601 347 | 1/1997 |
| EP | 1 522 624 | 4/2005 |

\* cited by examiner

*Primary Examiner* — Michael Barr
*Assistant Examiner* — David Cormier
(74) *Attorney, Agent, or Firm* — KED & Associates, LLP

(57) ABSTRACT

A tub assembly and a washing machine including the same are disclosed. A tub assembly of a washing machine includes a front tub having an entrance formed in a front portion thereof for introducing the laundry, and a rear tub having a front portion vibration-welded to a rear portion of the front tub by a vibration-welding device and a rear portion with a bearing housing provided therein. A washing machine includes a cabinet for defining an exterior thereof, a tub assembly provided within the cabinet for holding wash water and the laundry, and a motor for transmitting power to the tub assembly. An object of the present invention is to provide a tub assembly which can be manufactured without any difficulties in spite of a front tub having a complex structure.

21 Claims, 10 Drawing Sheets

TUB ASSEMBLY AND WASHING MACHINE INCLUDING THE SAME

This application claims the benefit of the Patent Korean Application No. P2005-75865 and No. P2005-75866, filed on Aug. 18, 2005, which are hereby incorporated by reference as if fully set forth herein.

BACKGROUND OF THE INVENTION

1. Field of the Invention

The present invention relates to a tub assembly and a washing machine including the same, more particularly, to a tub assembly which can be manufactured without any difficulties in spite of a front tub having a complex structure.

2. Discussion of the Related Art

In general, a washing machine is an appliance which performs washing through a washing, ringing, spinning and drying cycle to separate dirt from clothes, cloth items and beddings (hereinafter, the laundry) by using wash water, detergent and mechanical action.

Figure 1:
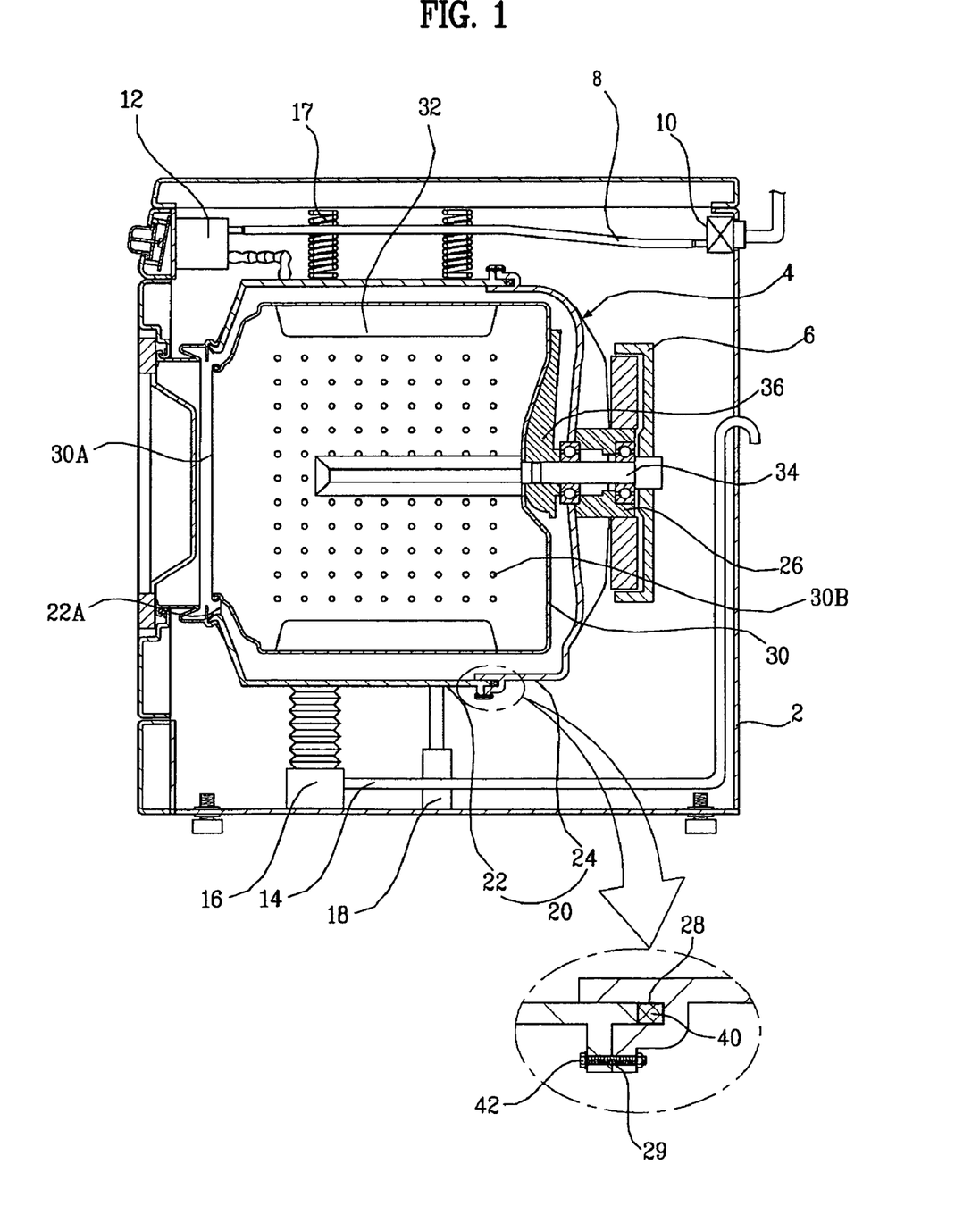
FIG. 1 is a sectional view illustrating a drum type washing machine having a conventional tub assembly mounted therein.
Figure 2:
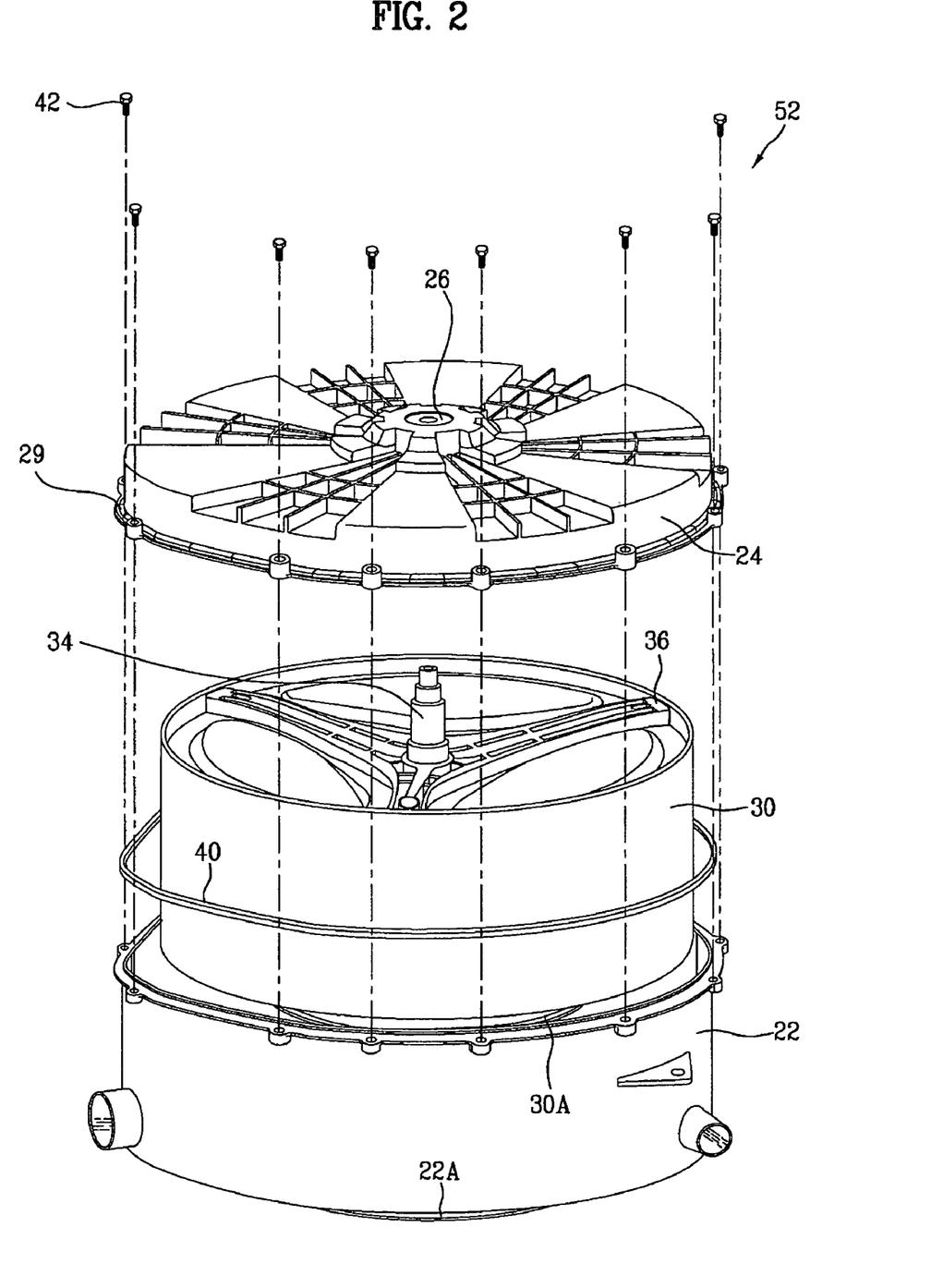
FIG. 2 is an exploded perspective view illustrating the tub assembly according to the related art.

FIG. 1 is a sectional view illustrating a drum type washing machine having a conventional tub assembly mounted therein and FIG. 2 is an exploded perspective view illustrating the tub assembly according to the related art.

The conventional drum type washing machine, as shown in FIG. 1, includes a cabinet 1 for defining an exterior thereof, a tub assembly 4 shock-absorbingly mounted within the cabinet 2 for holding wash water and the laundry, and a motor 6 mounted in rear of the tub assembly 4 for transmitting power to the tub assembly 4.

A water supply hose 8, a water supply valve 10 and a detergent supply part 12 are provided in an upper portion of the tub assembly 4. A water drain pump 14 and a water drain hose 16 are provided in a lower portion of the tub assembly 4.

The tub assembly 4 is shock-absorbingly mounted in the cabinet 2 by an elastic member 17 and a damper 18. The tub assembly 4 includes a tub 20 for holding wash water, a drum 30 rotatably mounted within the tub 20 for holding the laundry therein and plural lifters 32 fastened to an inner surface of the drum 30 for lifting the laundry to a predetermined height and dropping the laundry by its gravity. Also, plural through holes 30B are formed on the drum 30 for allowing wash water to pass there through.

Here, the tub 20 is injection-molded with plastic and includes a front tub 22 for defining a front part thereof, a rear tub 24 fastened to a rear portion of the front tub 22 for defining a rear part thereof.

The front tub 22 has a rear portion with an opened surface and an entrance 22A formed on a front surface for allowing the laundry to pass there through. Also, the rear tub 24 has a front portion with an opened surface and a rear portion having a rotation shaft 34 of the drum 30 to pass there through. A bearing housing 26 is formed as one body with the rear portion of the rear tub 24 for rotatably supporting the rear portion of the rear tub 24.

The rear portion of the front tub 22 and the front portion of the rear tub 24 are fixedly fastened by plural fastening members 42 in a state where a seal 40 is provided to prevent water leakage.

Thus, a sealing recess 28 is formed in the rear portion of the front tub 22 and the front portion of the rear tub 24 for installing the seal 40 therein. Plural fastening holes 29 are facing each other along a circumference for fastening the fastening member 42 thereto.

The drum 30 is made of metal sheet and includes an entrance 30A formed in a front portion thereof to communicate with the entrance 22A of the tub 20 and a spider 36 mounted to a rear portion thereof for fixing the rotation shaft 34 thereto.

A manufacturing process of the conventional tub assembly according to the related art will be described.

First, the front tub 22 and the rear tub 24 of the tub assembly 4 are injection-molded with plastic, and the drum 30 is molded with metal sheet.

At that time, the bearing housing 26 is inserted in the rear portion of the rear tub 24 and injection-molded, or fixed by an auxiliary fastening structure.

The spider 36, where the rotation shaft 34 of the drum 30 is formed, is fixedly fastened to the rear portion of the drum 30 and the plural lifters 32 are fixedly fastened to the inner circumferential surface of the drum 30.

The rear portion of the drum 30 is inserted in the rear tub 24 so that the rotation shaft 34 is inserted in the hole formed in the bearing housing 26.

The seal 40 is arranged in the sealing recess 28 formed in the front portion of the rear tub 24. The rear portion of the front tub 22 is closely contacted with the front portion of the rear tub 24 so that the front portion of the drum 30 is inserted in the front tub 22.

At that time, the position of the front tub 22 and the rear tub 24 are adjusted to fasten the fastening member 42 to the plural fastening holes 29, such that the rear portion of the tub 22 is in communication with the plural fastening holes 29 formed in the front portion of the rear tub 24.

The front tub 22 and the rear tub 24 are securely fastened by the fastening member 42 and sealing efficiency of the seal 40 is secured.

However, the conventional tub assembly of the drum type washing machine according to the related art has a problem of increased work time as well as high production cost in manufacturing the tub assembly, because the seal 40 is provided between the front rub 22 and the rear tub 24 and, after that, the fastening member 42 is fastened to the plural fastening holes 29.

Furthermore, there may be another problem that the seal 40 is missed by a worker's mistake or provided insecurely, and still another problem that the fastening member 42 is misassembled to deteriorate the secure fastening.

Still further, if the seal 40 is missed or insecurely provided, there may be still another problem that the front tub 22 and the rear tub 24 are severely vibrated to be damaged, or wash water is leaked between the front tub 22 and the rear tub 24.

Especially, since the sealing recess 28 having the seal 40 fastened thereto and the fastening hole 29 having the fastening member 42 fastened thereto are formed in the rear portion of the front tub 22 and the front portion of the rear tub 24, the fastening portion between the front tub 22 and the rear tub 24 should have a too much complex structure.

SUMMARY OF THE INVENTION

Accordingly, the present invention is directed to a tub assembly and a washing machine including the same.

An object of the present invention is to provide a tub assembly which can be manufactured without any difficulties in spite of a front tub having a complex structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a tub assembly of a washing machine includes a front tub having an entrance formed in a front portion thereof for introducing the laundry; and a rear tub having a front portion vibration-welded to a rear portion of the front tub by a vibration-welding device and a rear portion with a bearing housing provided therein.

That is, a tub assembly according to the present invention includes a tub having a front tub and a rear tub, and the front tub and, preferably, the rear tub are vibration-weldedly fastened.

The tub assembly of a washing machine further includes a drum and a rotation shaft. The drum is provided within the front tub and the rear tub. The rotation shaft has a side connected to the drum and the other side passing through the rear portion of the rear tub and is rotatably supported by the bearing housing. Preferably, the rotations shaft is connected to the drum through a spider.

The drum is provided within the front tub and the rear tub and the rotation shaft passes through the rear portion of the rear tub, such that the front tub and the rear tub are vibration-weldedly fastened. That is because it is easier that the drum is positioned within the front and rear tub after vibration-welding the front and rear tub.

The bearing housing may be insertedly injection-molded to be formed as one body with the rear portion of the rear tub. That is, the bearing housing is insert-molded together with that the rear tub is injection-molded. Thus, it is preferred that bearing housing is formed with plastic.

A bearing is provided within the bearing housing to support a support part of the rotation shaft. The rotation shaft has a support part supported by the bearing. An outer diameter of the support part is large enough to be inserted in the bearing and to rotate together with the bearing. Thus, the outer diameter tolerance is very important.

Preferably, an interference-proof part having an outer diameter smaller than an outer diameter of the support part is formed in front or rear of the support part of the rotation shaft. That is, the front tub and the rear tub may be vibration-welded after the interference-proof part of the rotation shaft is positioned in the bearing because the rotation shaft and the bearing are prevented from being collided against each other in spite of the vibration generated in vibration-welding the front tub and the rear tub. Thus, or damage of the rotation shaft due to deformation or shock may be prevented by the interference-proof part. Also, once the vibration-welding between the front tub and the rear tub is completed, the rotation shaft and the drum are returning to their original positions.

A first flange part may be expanded from an outer circumference of the rear portion of the front tub toward an outer radial direction, and a second flange part may be expanded from an outer circumference of the front portion of the rear tub toward an outer radial direction with corresponding to the first flange part. The first flange part and second flange part are pressed each other when the front tub and the rear tub are vibration-welded.

In another aspect of the present invention, a vibration-welding device for manufacturing a tub assembly includes a lower unit fixing the front tub thereto; an upper unit provided in an upper portion of the lower unit to vibration-weld the front portion of the rear tub to the rear portion of the front tub; and a support unit for supporting the drum to the lower unit when the front tub and the rear tub are vibration-welded.

Here, at least one of the lower unit and the upper unit is vibratile. However, the front portion of the front tub may be formed in a complex appearance and may be changed variously. Thereby, it is more preferred that only the upper unit is vibratile. Also, at least one of the lower unit and the upper unit is movable in an upward/downward direction.

The support unit is a guide protrusion unit closely-contactedly inserted in an entrance formed in the front portion of the drum and the guide protrusion is projected to an upper portion of the lower unit to a lower to prevent the drum from moving. The guide protrusion may be circularly formed in a bottom of the lower unit to be closely contacted with an inner or an outer circumferential surface of the entrance of the drum. Alternatively, the guide protrusion may be movable in a radial direction of the entrance of the drum.

The lower unit includes a lower surface part for seating the front portion of the front tub thereon so that the rear portion of the front tub is upward; and a lower contact part closely contacted to an outer circumferential surface of the front tub. The upper unit includes an upper surface part facing the rear portion of the rear tub so that the front portion of the rear tub is downward; and an upper contact part closely contacted to an outer circumferential surface of the rear tub.

Meanwhile, the support unit includes an elastic part provided in the lower surface part of the lower unit and a base part fixed to an upper end of the elastic part to elastically support the rear portion of the drum.

The elastic part is a coil spring vertically provided in the lower surface part, and the base part includes a base jig closely contacted to the rear portion of the drum and a connection rod having both opposite ends connected to the base jig and the elastic part, respectively.

In still another aspect of the present invention, a washing machine includes a cabinet for defining an exterior thereof; a tub assembly provided within the cabinet for holding wash water and the laundry; and a motor for transmitting power to the tub assembly. The tub assembly includes a front tub having an entrance formed a front portion for introducing the laundry; and a rear tub having a front portion vibration-welded to a rear portion of the front tub and a rear portion having a bearing housing provided therein.

The washing machine further includes a drum provided within the front tub and the rear tub for holding wash water therein; and a rotation shaft having a side connected to the drum and the other side rotatably supported by the bearing housing with passing through the rear portion of the rear tub, the rotation shaft connected to the motor.

The present invention has following advantageous effects.

According to the present invention, the front tub and the rear tub are vibration-welded, thereby resulting in making the work of fastening the front and rear tub simpler and faster. Thus, the tub assembly of the present invention has an effect that components cost and work time may be reduced, because the front and rear tub are fastened each other without any auxiliary fastening parts.

Furthermore, since the front and rear tub are vibration-welded, the front and rear tub are securely fastened enough to enhance tub strength and sealing efficiency. Thus, the tub assembly of the present invention has an effect that mal-assembly, which used to happen due to a worker's mistake, may be prevented.

Still further, as the rear tub is vibrated in a front/rear and right/left direction by the upper unit, the lower unit is vibration-welded to the front tub. Thus, Thus, the tub assembly of the present invention has an effect that the front and rear tub can be vibration-weldedly fastened even when the front tub is formed in a complex structure.

Still further, since the interference-proof part is formed in the rotation shaft to avoid the interference with the bearing, the collision between the rotation shaft and the bearing may be prevented when the front and rear tub are vibration-welded. Thereby, damage due to the collision may be also prevented.

Still further, since the drum provided within the front tub is shock-absorbingly supported when vibration-welding the front and rear tub, the tub assembly of the present invention has an effect that collision of the drum against the front tub and the lower unit or deformation of the rotation shaft of the drum may be prevented.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
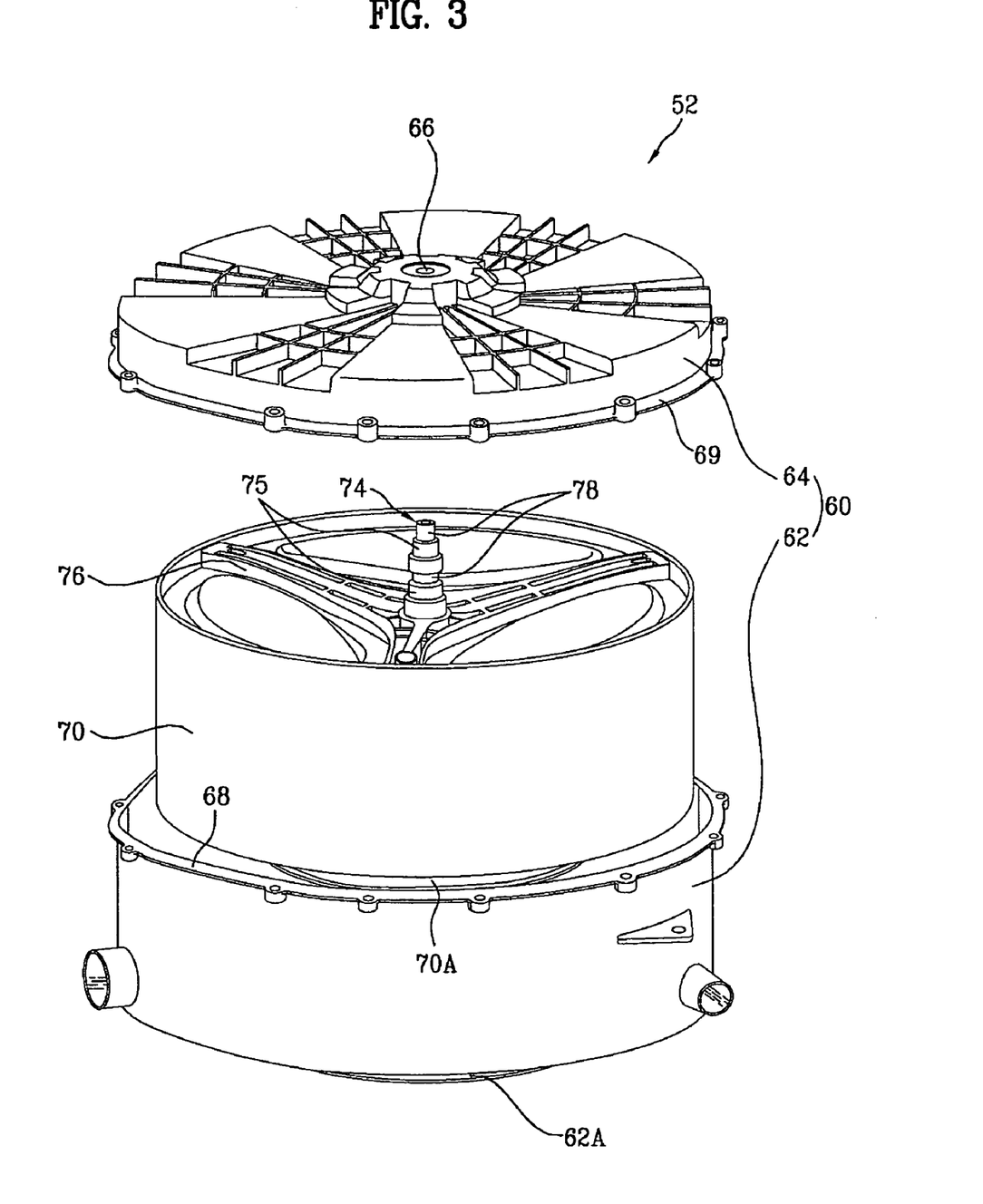
FIG. 3 is an exploded perspective view illustrating a tub assembly according to an embodiment of the present invention.

FIG. 3 is an exploded perspective view illustrating a tub assembly according to an embodiment of the present invention.

As shown in FIG. 3, the tub assembly 52 of a drum type washing machine according to the present invention includes a tub 60 having a front tub 62 and a rear tub 64 to hold wash water. Here, the rear tub 64 is fixedly vibration-welded to the front tub 62. The tub assembly 52 also includes a drum 70 and a rotation shaft 74, and a side of the rotation shaft 74 is fastened to a rear portion of the drum 70 through a spider 76.

As the rotation shaft 74 passes through a rear portion of the rear tub 64, the drum 70 is rotatably mounted within the tub 60 to hold the laundry therein.

The tub 60 is injection-molded with plastic. The front tub 62 defines a front part of the tub 60 and the rear tub 64 defines a rear part of the tub 60.

An entrance 62A is formed in a front portion of the front tub 62 and a first flange part 68 is formed along an outer circumference of a rear portion of the front tub 62.

The rotation shaft 74 of the drum 70 passes through the rear portion of the rear tub 64. Together with that, a bearing housing 66 is formed in the rear portion of the rear tub 64 to rotatably support the rotation shaft 74 and a second flange part 69 is formed an outer circumference of the front portion of the rear tub 64.

The first flange part 68 and the second flange part 69 are projected from the rear portion of the front tub 62 and the front portion of the rear tub 64 toward an outer radial direction, such that the front tub 62 and the rear tub 64 are pressedly vibration-welded. Thus, when the front tub 62 and the rear tub 64 are vibration-welded, a vibration-welding portion is increased by the first and second flange part 68 and 69. Thereby, the front tub 62 and the rear tub 64 are fastened more firmly.

The drum 70 is made with metal sheet. An entrance 70A is formed in a front portion of the drum 70 to communicate with the entrance 62A of the tub 60, and a spider 76 is fastened to a rear surface of the rear portion of the drum 70 to fix the rotation shaft 74 thereto.

The rotation shaft 74 of the drum 70 is put to pass through the bearing housing 66 and rotatably contacted with a bearing 67 provided within the bearing housing 66. The portion of the rotation shaft 74 contacted with the bearing 67 is a support part 75 for supporting the rotation shaft 74.

Thus, the drum 70 may be rotatably supported by the rotation shaft 74 and the bearing housing 66.

The drum 70 further includes an interference-proof part 78 formed along an outer circumference of the rotation shaft 74 to prevent the bearing housing 66 and the rotation shaft 74 from interfering with the vibration-welding between the front tub 62 and the rear tub 64.

The interference-proof part 78 is spaced apart in front or rear of the support part of the rotation shaft 74 in a predetermined distance, and the width thereof is deeper than the width which is vibrated in vibration-welding the front tub 62 and the rear tub 64. That is, an outer diameter of the interference-proof part 78 is smaller than an outer diameter of support part 75.

The drum 70 is moved forwardly or backwardly in a predetermined distance. After that, the front tub 62 and the rear tub 64 are vibration-welded. Thus, the rotation shaft 74 is also moved forwardly or backwardly in a predetermined distance, such that the interference-proof part 78 of the rotation shaft 74 is positioned corresponding to the bearing 67.

Thereby, a predetermined space is formed between the rotation shaft 74 and the bearing 67 by the interference-proof part 78, such that collision between the rotation shaft 74 and the bearing 67 is prevented by the predetermined space even when one of the two is vibrated.

Hence, once the vibration-welding is completed, the drum 70 and the rotation shaft 74 returns to their original positions.

Figure 4:
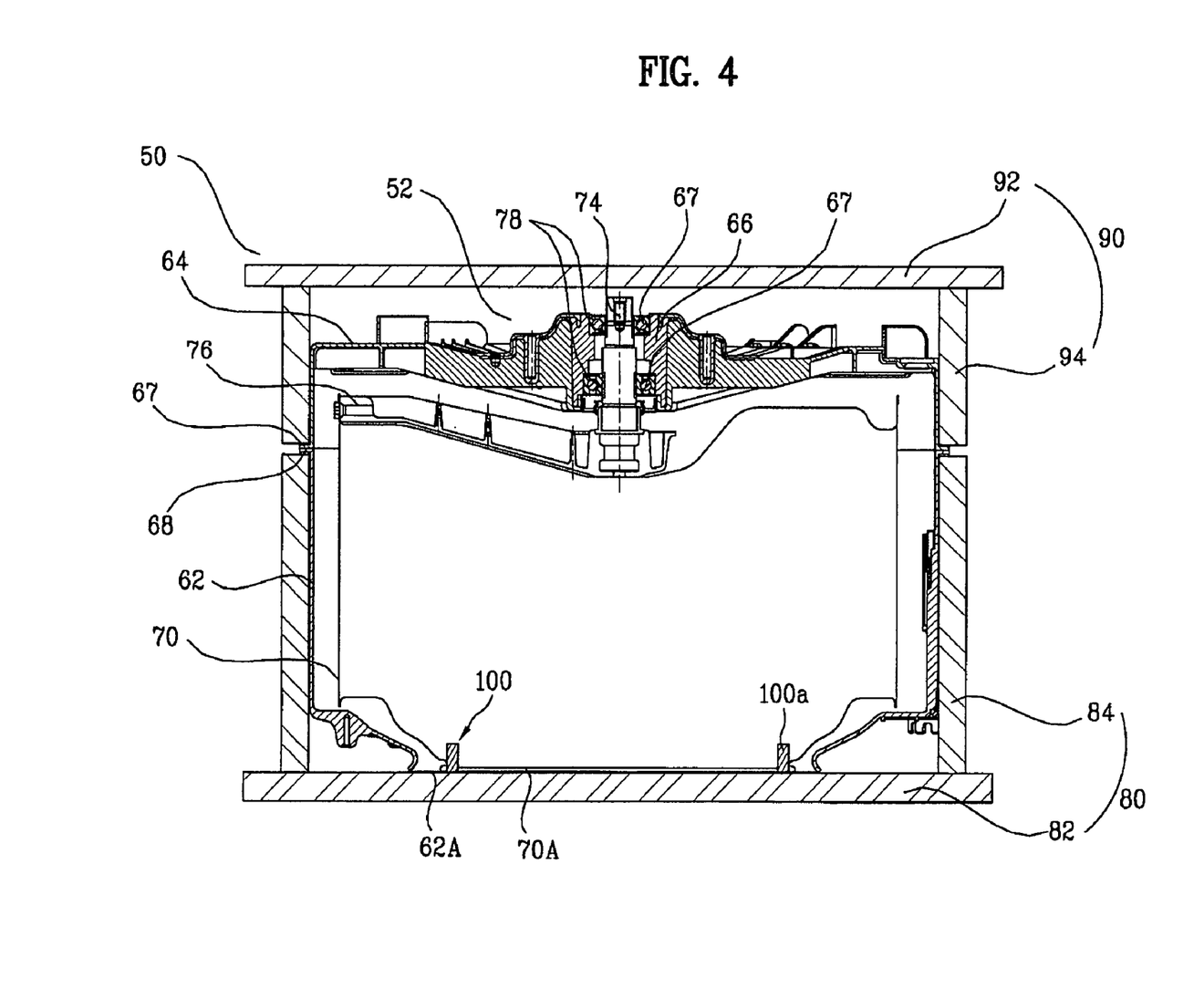
FIG. 4 is a diagram schematically illustrating a vibration-welding device for manufacturing the tub assembly of FIG. 3.
Figure 5:
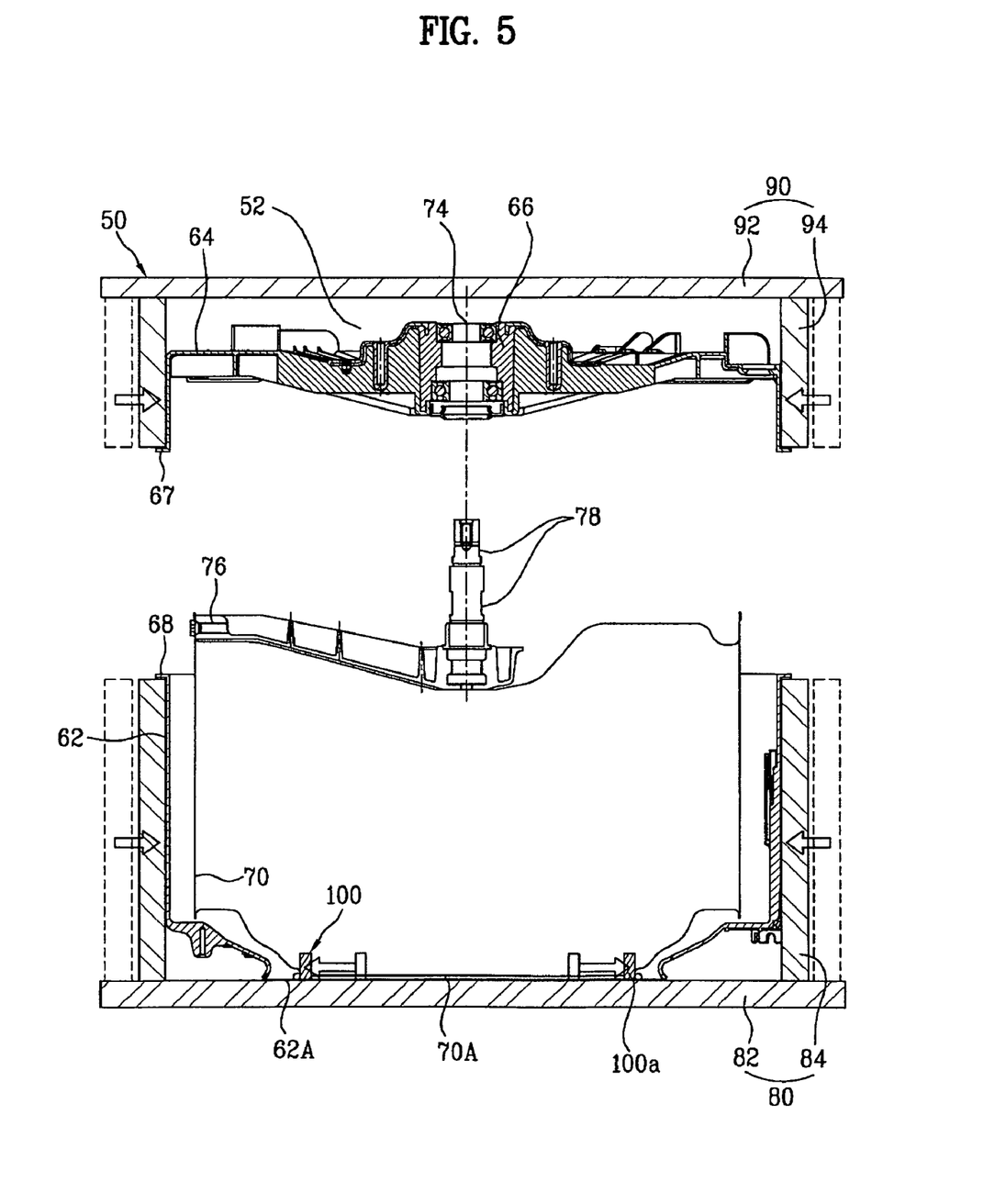
FIGS. 5 and 6 are diagrams illustrating a state where the vibration-welding device of FIG. 4 is operated.
Figure 6:
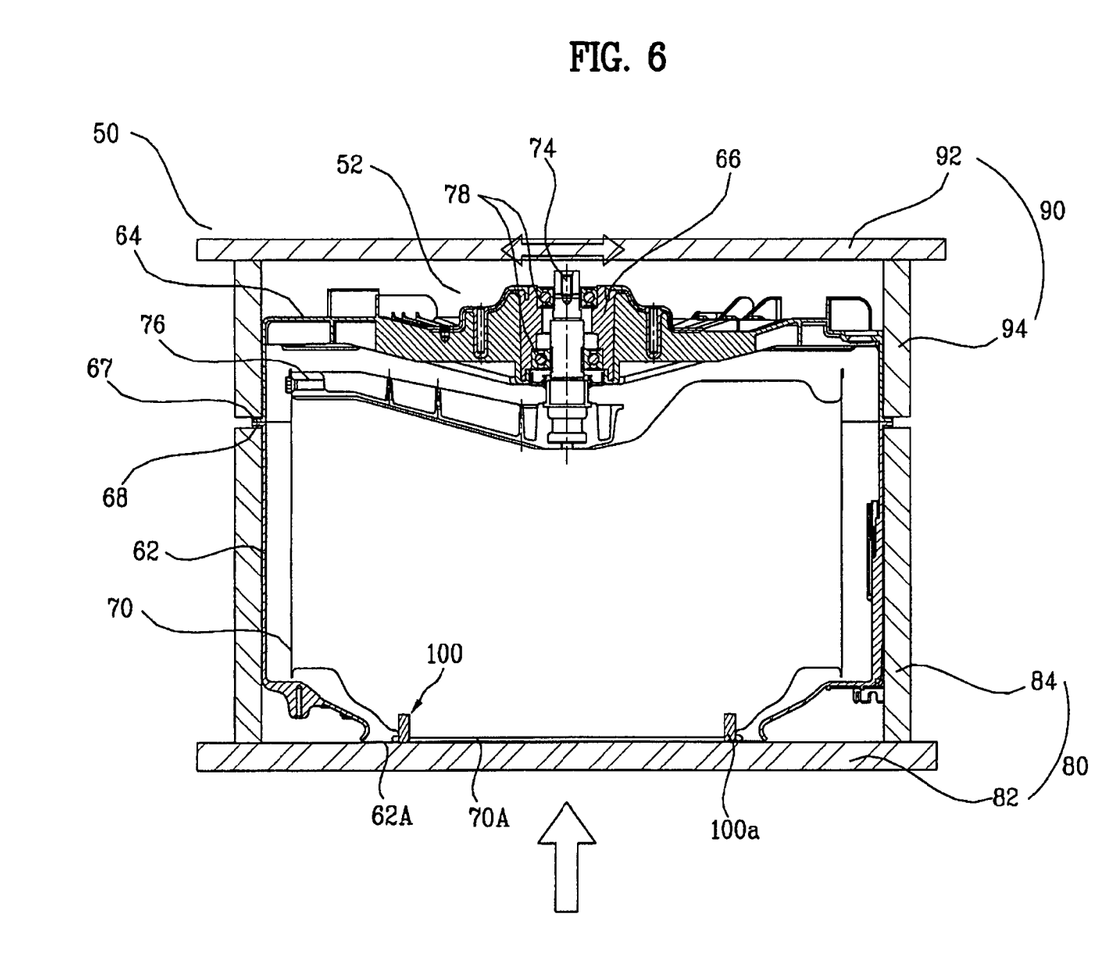

FIG. 4 is a diagram schematically illustrating a vibration-welding device for manufacturing the tub assembly 52 of FIG. 3, and FIGS. 5 and 6 are diagrams illustrating a state where the vibration-welding device of FIG. 4 is operated. The same reference numbers are given to same configurations as described above and the detailed description thereof will be omitted.

As shown in FIGS. 4, 5 and 6, the vibration-welding device includes a lower unit 80, an upper unit 90 and a support unit 100. The front tub 62 is fixed to the lower unit 80 so that the rear portion of the front tub 62 is upward. The rear tub 64 is fixed to the upper unit 90 so that the front portion of the rear tub 64 is downward. The support unit 100 is projected from a bottom of the lower unit 80 so that the drum 70 is supported by the lower unit 80 when the front tub 62 and the rear tub 64 are vibration-welded.

The lower unit 80 includes a lower surface part 82 and a lower contact part 84. The front portion of the front tub 62 is supportedly seated on the lower surface part 82 and the lower contact part 84 is closely contacted with an outer circumferential surface of the front tub 62.

Plural lower contact parts 84 are circularly projected on the lower surface part to be contacted with the outer circumferential surface of the front tub.

The plural lower contact parts 84 are fixed to the lower surface part 82 in the same diameter as that of the front tub so that the front tub 62 is fixedly inserted in the lower surface part 84. Alternatively, the plural lower contact parts 84 are movable in a radial direction with respect to the lower surface part 82 so that it is pressed on the outer circumferential surface of the front tub 62 to fix the front tub 62.

It is limited on description convenience that the lower contact part 84 is movable in a radial direction with respect to the lower surface part 82 to be pressed on the outer circumferential surface of the front tub 62.

Thus, since the front tub 62 formed in various sizes may be fixed by the lower contact part 84, public use of the lower unit 80 in spite of various sized front tubs 62 may be embodied.

The upper unit 90 includes an upper surface part 92 and an upper contact part 94. The upper surface part 92 is spaced apart from the rear portion of the rear tub 64 so that the rotation shaft 74 is provided to pass through the rear portion of the rear tub 64. The upper contact part 94 is closely contacted with the outer circumferential surface of the rear tub 64.

Plural upper contact parts 94 are arranged in circle to be closely contacted with the outer circumferential surface of the rear tub 64. Also, the upper contact part 94 is pressed to the outer circumferential surface of the rear tub 64 and movable in a radial direction of the lower surface part 82 to fix the rear tub 64 thereto.

Especially, at least one of the lower unit 80 and the upper unit 90 is movable in an upward/downward direction so that the front tub 62 and the rear tub 64 are fixed to the lower unit 80 and the upper unit 90 as well as so that the vibration-welded tub assembly 52 is drawn from the lower unit 80 and the upper unit 90.

On description convenience, it is limited in the embodiment that the lower unit 80 is movable in an upward/downward direction.

The lower contact part 84 and the upper contact part 94 press the first flange part 68 and the second flange part 69 each other when the front tub 62 and the rear tub 64 are vibration-welded.

That is, when the front tub 62 and the rear tub 64 are vibration-welded, a lower surface of the first flange part 68 is pressed upwardly by an upper end of the lower contact part 84 and an upper surface of the second flange part 69 is pressed downwardly by a lower end of the upper contact part 94.

Also, the support unit 100 is close-contactedly inserted in the entrance 70A of the drum 70 to prevent the drum 70 from moving. The support unit 100 may be a guide protrusion 100a projected upwardly from the lower surface part 82 of the lower unit 80.

That is, as the front tub 62 is fixed to the lower unit 80, the drum 70 within the front tub 62 is moved as downwardly as possible to contact the front portion of the drum 70 with the upper surface of the lower surface part 82. Hence, an outer circumferential surface of the entrance 70A formed in front of the drum 70 is inserted in the guide protrusion 100a or the guide protrusion 100a is inserted in an inner circumferential surface of the entrance 70A, such that the drum 70 is fixed to the lower surface part 82.

The guide protrusion 100a is circularly formed on the upper surface of the lower unit 80 in the same diameter as that of the entrance 70A, or plural guide protrusions 100a are circularly formed on the upper surface of the lower surface part 82 in a predetermined distance.

It is limited in the embodiment that the plural guide protrusions 100 are spaced apart on the upper surface of the lower surface part 82 in a predetermined distance.

The guide protrusion 100a is movable in a radial direction of the entrance 70A formed in the drum 70 so that any of various sized drums 70 may be fixed to the lower surface part 82.

That is, the guide protrusion 100a may be closely contactedly fixed to an inner circumferential surface of the entrance 70A formed in any of drums 70 having various diameters as it moves in a radial direction of the entrance 70A. Thereby, the drum 70, which may have various sized entrances 70A, is fixed to the lower unit 80.

Whereas, of the guide protrusion 100a having a predetermined diameter is formed on the upper surface of the lower surface part 82, the diameter of the entrance 70A is predetermined. Thereby, only the drum 70 having the predetermined sized entrance 70A may be fixed to the lower unit 80.

A bearing housing 66 rotatably supported by a bearing 67 is formed in the rear portion of the rear tub 64 and the rotation shaft 74 of the drum 70 passes through the bearing housing 66. Also, the drum 70 moves downwardly a predetermined distance when the front tub 62 and the rear tub 64 are vibration-welded. Hence, the rotation shaft 74 of the drum 70 also moves downwardly a predetermined distance and the support part 75 contacted with the bearing 67 of the bearing housing 66 also moves backwardly a predetermined distance. Alternatively, the support part 75 supporting the rotation shaft 74 may move forwardly a predetermined distance.

The support part 75 contacted with the bearing 67 of the bearing housing 66 is not contacted with the bearing 67, when the drum 70 moves downwardly. Instead, the bearing 67 is facing the interference-proof part 78 of the rotation shaft 74 and predetermined space is formed between the bearing 67 and the interference-proof part 78. That is, the outer diameter of the interference-proof part 78 is smaller than the outer diameter of other parts of the rotation shaft 78, especially the outer diameter of the support part 75 of the rotation shaft 74. Here, it is preferred that the distance between the bearing 67 and the interference-proof part 78 is larger than the vibration width of the upper unit 90 or the lower unit 80 when the front tub 62 and the rear tub 64 are vibration-welded.

A manufacturing process of the tub assembly 52 by using the vibration-welding device 50 will be described.

First, the front tub 62 and the rear tub 64 are separately injection-molded with plastic and the drum 70 is sheet-molded with metal.

At that time, the front tub 62 has the entrance 62A formed in a front portion thereof and a first flange part 68 formed in the outer circumference of the opened rear portion. The rear tub 64 has the bearing housing 66 insertedly formed as one body with the rear portion thereof and the second flange part 69 formed in the outer circumference of the opened front portion thereof.

The drum 70 has a center of the rear portion, in other words a center of an inner rear surface, projected forwardly and the spider 76 connected to the rotation shaft 74 is fixedly fastened to a rear surface of the rear portion of the drum 70.

The interference-proof part 78 is formed in a predetermined depth along the outer circumference of the rotation shaft 74.

As shown in FIG. 5, the front portion of the drum 70 is inserted in the front tub 62 and the front tub 62 having the drum 70 inserted therein is seated on the lower surface part 82 of the lower unit 80.

Hence, the guide protrusion 100a is inserted inwardly through the tub 60 and the entrance 70A of the drum 70 and the guide protrusion 100a provided in the entrance 70A of the drum 70 moves in a radial direction to be closely contacted with the inner circumferential surface of the entrance 70A of the drum 70.

Thus, the inner circumferential surface of the entrance 70A is supported by the guide protrusion 100a and the drum 70 is fixed to the lower unit 80, such that the drum 70 cannot move in a front/rear and right/left direction.

More specifically, when the front tub 62 and the rear tub 64 are vibration-welded, the drum 70 moves as downwardly as possible to contact the entrance 70A with the lower surface part 82. Hence, the inner circumferential surface of the entrance 70A is closely contacted with the guide protrusion 100a, so that the drum 70 may be fixed by the guide protrusion 100a even when the upper unit 90 or the lower unit 80 is vibrated.

As shown in FIG. 6, once the front tub 62 having the drum 70 inserted therein is fixedly seated on the lower surface part 82, the plural lower contact parts 84 installed in the lower surface part 82 moves to be contacted with the outer circumferential surface of the front tub 62. Hence, the front tub 62 is fixed to the lower unit 80 by the plural lower contact parts 84.

The rear tub 64 is fixed to the upper unit 90, because the plural upper contact parts 94 movably provided on the upper surface part 92 of the upper unit 90 are closely contacted with the outer circumferential surface of the rear tub 64.

The rear tub 64 is fixed and spaced apart in a predetermined distance downwardly from the upper surface part 92 so that the rotation shaft 74 of the drum 70 which passes through the bearing housing 66 is provided between the rear tub 64 and the upper surface part 92.

Meanwhile, the lower unit 80 moves upwardly so that the rear portion of the front tub 62 fixed to the lower unit 80 may be closely contacted with the front portion of the rear tub 64 fixed to the upper unit 90.

At that time, the first flange part 68 and the second flange part 69 are pressed by the lower contact part 84 and the upper contact part 94, and the rotation shaft 74 of the drum 70 passes through the bearing housing 66 of the rear tub 64 to be positioned between the rear tub 64 and the upper surface part 92.

Once the rear portion of the front tub 62 having the first flange part 68 formed therein is closely contacted with the front portion of the rear tub 64 having the second flange part 69 formed therein, the upper unit 90 is vibrated at a high speed in a front/rear and a right/left direction to vibration-weld the front tub 62 to the rear tub 64.

That is, as the rear tub 64 is vibrated by the upper unit 90 at a high speed, the injection-molded part is vibration-welded by the heat generated on the contacted surface between the front tub 62 and the rear tub 64.

At that time, as the upper unit 90 is vibrated, the rear tub 64 is also vibrated. Due to the vibration of the rear tub 64, the bearing housing 66 is also vibrated in a front/rear and a right/left direction at a high speed.

However, the rotation shaft 74 of the drum 70 is fixed to the upper surface of the lower surface part 82 by the guide protrusion 100a. But, since the drum 70 is moved downwardly and then the interference-proof part 78 of the rotation shaft 74 is facing the bearing 67, the interference of the bearing housing 66 and the rotation shaft 74 is prevented by the interference-proof part 78 in spite of the vibration of the bearing housing 66.

Once the interference and collision of the bearing housing 66 and the rotation shaft 74 are prevented by the interference-proof part 78, the problem of damage due to the collision between the bearing housing 66 and the rotation shaft 74 may be prevented. Also, it is prevented that the drum 70 is damaged as the drum 70 is collided against the lower unit 80 and the front tub 62 or that the guide protrusion 100 is damaged.

If the front tub 62 and the rear tub 64 are vibration-welded as described above, either of the lower contact part 84 and the upper contact part 94 is getting loose so that the lower unit 80 may move downwardly. Thereby, the tub assembly 52 is detachable from the vibration-welding device 50.

In case that the motor 6 is mounted to the tub assembly 52, the drum 70 moves backwardly and, in that state, the motor 6 is mounted to the rotation shaft 74 so that the rotation shaft 74 is rotatably supported to the bearing By the way, the lower unit 80 of the vibration-welding device 50, not the upper unit 90, may be vibratile in a front/rear and a right/left direction. Alternatively, both of the upper unit 90 and the lower unit 80 may be vibratile in a front/rear and a right/left direction.

However, it is preferred that only the upper unit 90 is vibratile in a front/rear and a right/left direction, because the front tub 62 and the rear tub 64 may be vibration-welded smoothly even if the front tub 62 has a complex structure.

Figure 7:
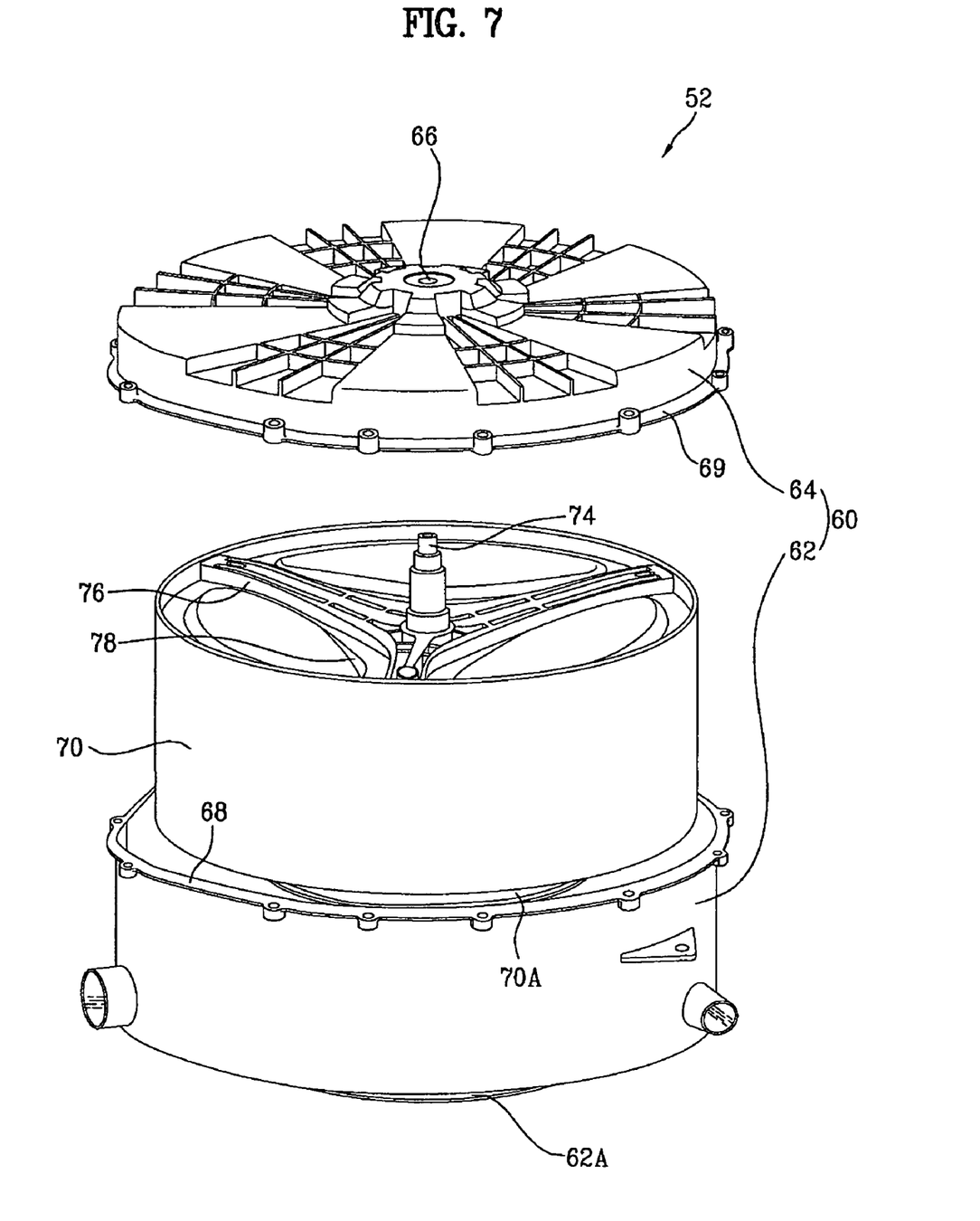
FIG. 7 is an exploded perspective view illustrating a tub assembly according to another embodiment of the present invention.

FIG. 7 is an exploded perspective view illustrating a tub assembly according to another embodiment of the present invention.

The tub assembly 52 according to another embodiment of the present invention is the same the tub assembly according to the embodiment described before, but the interference-proof part 78 is not formed in the rotation shaft 74 in another embodiment. As described later, the support part 100 is not supportedly fixing the drum 70 but elastically supporting the drum 70. Thus, according to another embodiment, it is not necessary that the drum 70 and the rotation shaft 74 should be moved a predetermined distance when the front tub 62 and the rear tub 64 are vibration-welded.

Figure 8:
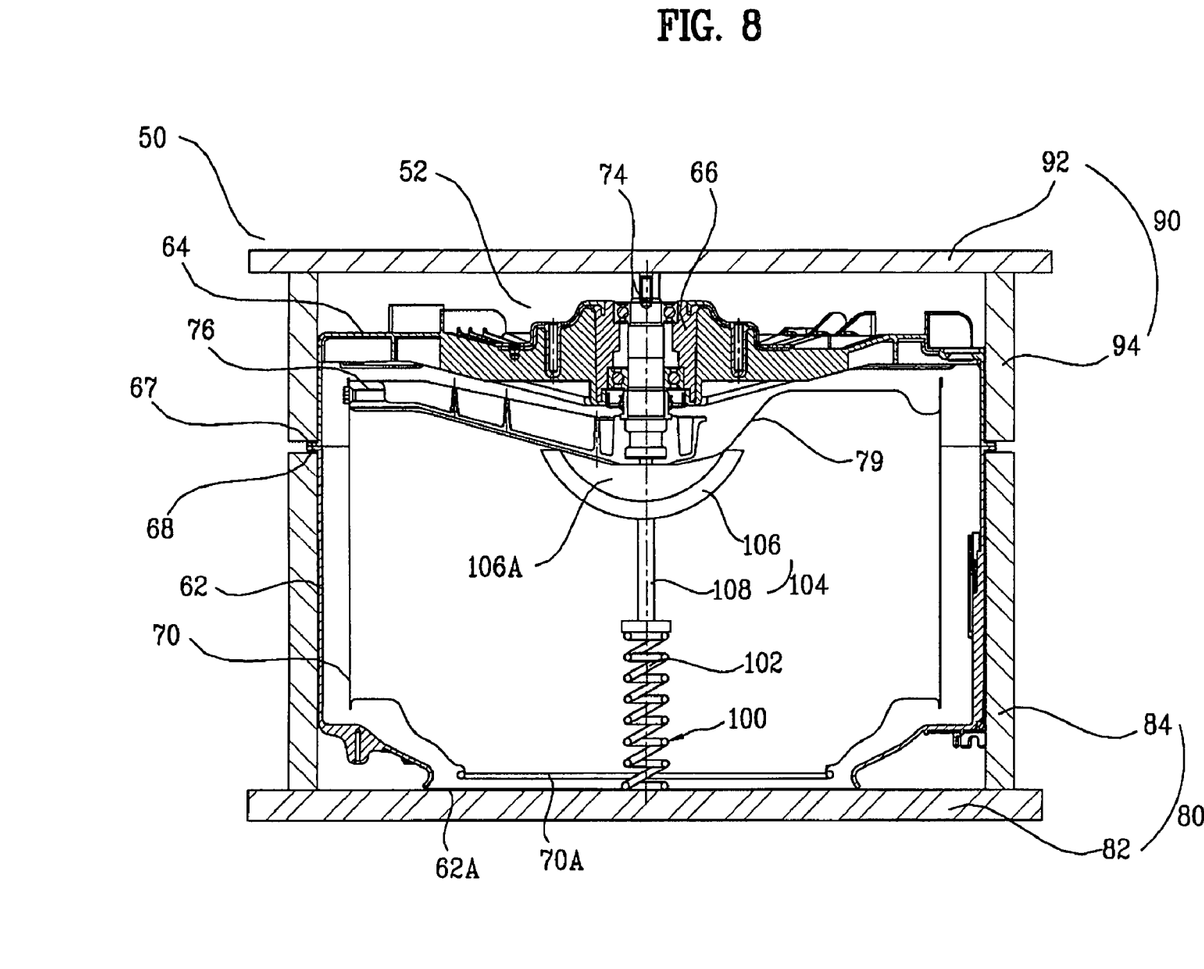
FIG. 8 is a diagram schematically illustrating a vibration-welding device for manufacturing the tub assembly of FIG. 7.
Figure 9:
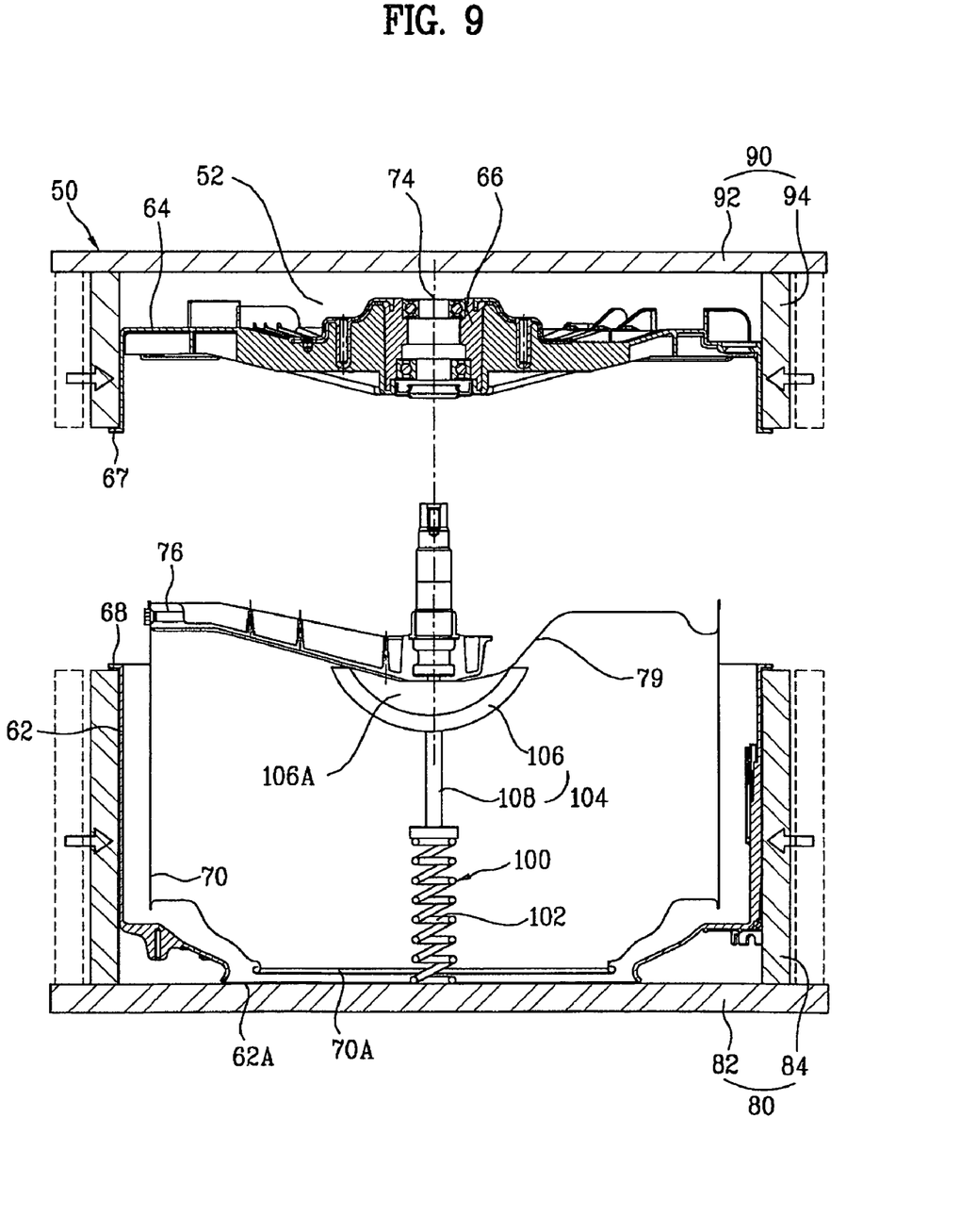
FIGS. 9 and 10 are diagrams schematically illustrating the vibration-welding device of FIG. 7.
Figure 10:
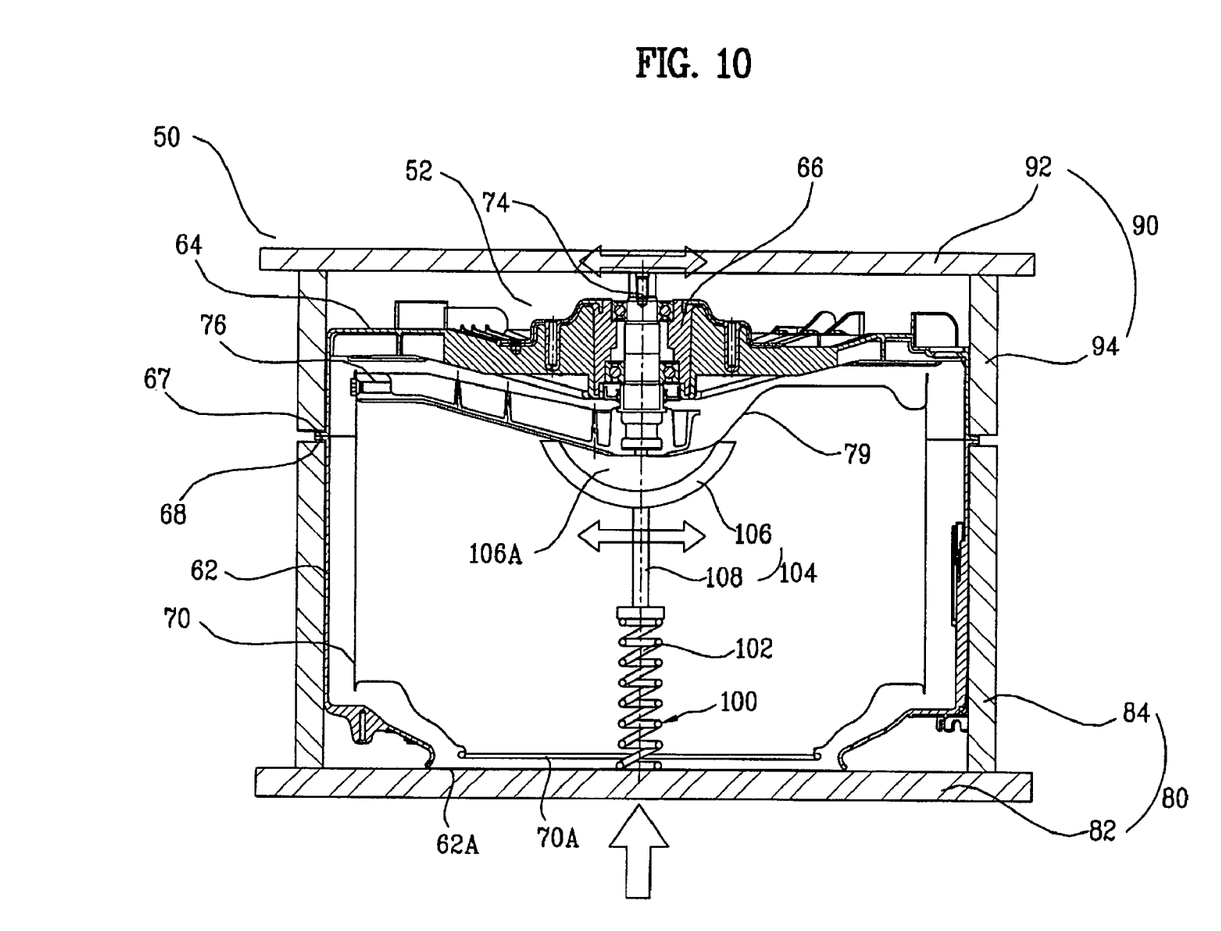

If referring to FIGS. 8 to 10, the tub assembly of another embodiment will be suggested more precisely and more understandably.

FIG. 8 is a diagram schematically illustrating a vibration-welding device for manufacturing the tub assembly of FIG. 7. FIGS. 9 and 10 are diagrams schematically illustrating the vibration-welding device of FIG. 7.

In the vibration-welding device 50 applied to this embodiment, the support unit 100 of the vibration-welding device 50 is not the guide protrusion 100a and the other configurations are the same.

A support unit 100 of this embodiment is provided on a lower unit 80 to shock-absorbingly support the drum 70 provided within a front tub 62, when a front tub 62 and a rear tub 64 are vibration-welded.

The support unit 100 prevents the drum 70 from moving downwardly and includes an elastic part 102 and a base part 104. The elastic part 102 is perpendicularly provided in a center of the lower surface part 82 of the lower unit 80 and the base part 104 is fixed to an upper end of the elastic part 102 to support the center of the rear portion of the drum 70. Thus, the elastic part 102 and the base part 104 shock-absorbingly and securely support the drum 70.

The base part 104 includes a base jig 106 and a connection rod 108. The base jig 106 is closely contacted with the rear potion of the drum 70, more specifically, a center of the inner rear portion of the drum 70. The connection rod 108 has an upper end and a lower end connected to the base jig 106 and the elastic part 102, respectively.

An insert recess 106A is formed in a center of the base jig 106 so that the center of the rear portion of the drum 70 may be inserted therein.

The insert recess 106A is recessed downwardly in a predetermined depth for a center portion 79 of the rear portion of the drum 70 which is forwardly projected to be inserted therein. Thus, the base jig 106 may be formed in a hemisphere, a cylinder or a corn shape.

A manufacturing process of the tub assembly 52 according to the present invention is the same as described in the above embodiment. As the rear tub 64 is vibrated at a high speed by the upper unit 90, the injection-molded part is welded by the heat generated on the contacting surface between the front tub 62 and the rear tub 64. Thereby, the front tub 62 and the rear tub 64 are vibration-weldedly fixed.

However, according to another embodiment, as the elastic part 102 is elastically transformed in a front/rear and right/left direction, the drum 70 is supported by the base part 104. Thereby, the drum 70 is vibrated with the rear tub 64 in a state where the drum 70 is prevented from being moving downwardly by the support unit 100.

Thus, the drum 70 is prevented from being collided with the lower unit 80 and the front tub 62 and also stress is concentrated on the rotation shaft 74 only to prevent deformation and damage of the drum 70.

Meanwhile, according to the present invention, there may be provided a washing machine including a cabinet 2 (see FIG. 1) for defining an exterior thereof, a tub assembly 52 for holding wash water and the laundry, and a motor 6 (see FIG. 1) for transmitting power to the tub assembly 52.

Here, the tub assembly 52 includes, as described before, a front tub 62 having an entrance formed in a front portion thereof to introduce the laundry therein, and a rear tub 64 having a front portion thereof having a front portion vibration-welded to a rear portion of the front tub 62 and a rear portion having a bearing housing 66 provided therein.

Furthermore, the washing machine further includes a drum 70 provided within the front tub 62 and the rear tub 64 for holding wash water therein, and a rotation shaft 74 having a side connected to the drum 70 and the other side rotatably supported by the bearing housing 66 with passing through the rear portion of the rear tub 64, the rotation shaft 74 connected to the motor 6.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A tub assembly of a washing machine comprising:
    a front tub having an entrance formed in a front portion thereof for introducing laundry;
    a rear tub having a front portion vibration-welded to a rear portion of the front tub by a vibration-welding device and having a rear portion with a bearing housing provided therein;
    a drum provided within the front tub and the rear tub when the front tub and the rear tub are vibration-weldedly fastened; and
    a rotation shaft having a side connected to the drum and the other side passing through the rear portion of the rear tub, the rotation shaft comprising two support parts to be rotatably supported by two bearings provided within the bearing housing and an interference-proof part provided between the support parts and having an outer diameter smaller than an outer diameter of the support parts, wherein the interference-proof part is located to face one of the bearings to form a radial gap along a circumferential direction of the rotation shaft between the interference-proof part and one of the bearings when the front tub and the rear tub are vibration-weldedly fastened in order to prevent contact between the rotation shaft and the bearings.

2. The tub assembly of a washing machine as claimed in claim 1, wherein the bearing housing is formed as one body with the rear portion of the rear tub by insert injection molding.

3. The tub assembly of a washing machine as claimed in claim 1, wherein the front tub and the rear tub are vibration-welded after the interference-proof part of the rotation shaft is positioned in the bearing.

4. The tub assembly of a washing machine as claimed in claim 1, wherein a first flange part is expanded from an outer circumference of the rear portion of the front tub toward an outer radial direction, and a second flange part is expanded from an outer circumference of the front portion of the rear tub toward an outer radial direction with corresponding to the first flange part.

5. The tub assembly of a washing machine as claimed in claim 4, wherein the first flange part and the second flange part are pressed toward each other when the front tub and the rear tub are vibration-welded.

6. The tub assembly of a washing machine as claimed in claim 1, wherein the vibration-welding device comprises:
    a lower unit fixing the front tub thereto;
    an upper unit provided in an upper portion of the lower unit to vibration-weld the front portion of the rear tub to the rear portion of the front tub; and
    a support unit for supporting the drum to the lower unit when the front tub and the rear tub are vibration-welded.

7. The tub assembly of a washing machine as claimed in claim 6, wherein at least one of the lower unit or the upper unit is vibratile.

8. The tub assembly of a washing machine as claimed in claim 6, wherein at least one of the lower unit or the upper unit is movable in an upward/downward direction.

9. The tub assembly of a washing machine as claimed in claim 6, wherein the support unit is a guide protrusion closely-contactedly inserted in an entrance formed in the front portion of the drum and the guide protrusion is projected to an upper portion of the lower unit to prevent the drum from moving.

10. The tub assembly of a washing machine as claimed in claim 9, wherein the guide protrusion is circularly formed in a bottom of the lower unit to be closely contacted with an inner circumferential surface or an outer circumferential surface of the entrance of the drum.

11. The tub assembly of a washing machine as claimed in claim 9, wherein the guide protrusion is movable in a radial direction of the entrance of the drum.

12. The tub assembly of a washing machine as claimed in claim 6, wherein the lower unit comprises:
a lower surface part for seating the front portion of the front tub thereon so that the rear portion of the front tub is upward; and
a lower contact part closely contacted to an outer circumferential surface of the front tub.

13. The tub assembly of a washing machine as claimed in claim 12, wherein the upper unit comprises:
an upper surface part facing the rear portion of the rear tub so that the front portion of the rear tub is downward; and
an upper contact part closely contacted to an outer circumferential surface of the rear tub.

14. The tub assembly of a washing machine as claimed in claim 6, wherein the support unit comprises:
an elastic part provided in a lower surface part of the lower unit; and
a base part fixed to an upper end of the elastic part to elastically support the rear portion of the drum.

15. The tub assembly of a washing machine as claimed in claim 14, wherein the elastic part is a coil spring vertically provided in the lower surface part, and the base part includes a base jig closely contacted to the rear portion of the drum and a connection rod having both opposite ends connected to the base jig and the elastic part, respectively.

16. A tub assembly of a washing machine comprising:
a front tub having an entrance formed in a front portion thereof for introducing the laundry;
a rear tub having a front portion vibration-welded to a rear portion of the front tub by a vibration-welding device and having a rear portion with a bearing housing provided therein;
a drum provided within the front tub and the rear tub when the front tub and the rear tub are vibration-weldedly fastened; and
a rotation shaft having a side connected to the drum and the other side passing through the rear portion of the rear tub, the rotation shaft comprising two support parts to be rotatably supported by two bearings provided within the bearing housing and two interference-proof parts provided adjacent the two support parts respectively and having outer diameters smaller than outer diameters of the support parts respectively, wherein the interference-proof parts are located to face the bearings respectively to form radial gaps along a circumferential direction of the rotation shaft between the interference-proof parts and the bearings respectively when the front tub and the rear tub are vibration-weldedly fastened in order to prevent contact between the rotation shaft and the bearings.

17. The tub assembly of a washing machine as claimed in claim 16, wherein the bearing housing is formed as one body with the rear portion of the rear tub by insert injection molding.

18. The tub assembly of a washing machine as claimed in claim 16, wherein the front tub and the rear tub are vibration-welded after the two interference-proof parts of the rotation shaft are positioned in the bearings, respectively.

19. The tub assembly of a washing machine as claimed in claim 16, wherein a first flange part is expanded from an outer circumference of the rear portion of the front tub toward an outer radial direction and a second flange part is expanded from an outer circumference of the rear portion of the rear tub toward an outer radial direction with corresponding to the first flange part.

20. The tub assembly of a washing machine as claimed in claim 19, wherein the first flange part and the second flange part are pressed to each other when the front tub and the rear tub are vibration-welded.

21. A washing machine comprising:
a cabinet to define an exterior of the washing machine; and
a tub assembly shock-absorbingly mounted within the cabinet to hold wash water and laundry, wherein the tub assembly comprises:
a front tub having an entrance formed in a front portion thereof for introducing the laundry,
a rear tub having a front portion vibration-welded to a rear portion of the front tub by a vibration-welding device and having a rear portion with a bearing housing provided therein,
a drum provided within the front tub and the rear tub when the front tub and the rear tub are vibration-weldedly fastened, and
a rotation shaft having a first side connected to the drum and a second side passing through the rear portion of the rear tub, the rotation shaft comprising two support parts to be rotatably supported by two bearings provided within the bearing housing and an interference-proof part provided between the support parts and having an outer diameter smaller than an outer diameter of the support parts, wherein the interference-proof part is located to face one of the bearings to form a radial gap along a circumferential direction of the rotation shaft between the interference-proof part and one of the bearings when the front tub and the rear tub are vibration-weldedly fastened in order to prevent contact between the rotation shaft and the two bearings.

* * * * *